United States Patent
Barber

[19]

[11] Patent Number: 5,802,674
[45] Date of Patent: Sep. 8, 1998

[54] FIBRE METERING ARRANGEMENT

[75] Inventor: Roy Michael Barber, Heckmondwike, United Kingdom

[73] Assignee: Garnett Controls Limited, West Yorkshire, United Kingdom

[21] Appl. No.: 849,031

[22] PCT Filed: Nov. 13, 1995

[86] PCT No.: PCT/GB95/02648

§ 371 Date: May 9, 1997

§ 102(e) Date: May 9, 1997

[87] PCT Pub. No.: WO96/15299

PCT Pub. Date: May 23, 1996

[30] Foreign Application Priority Data

Nov. 12, 1994 [GB] United Kingdom .................... 9422889

[51] Int. Cl.⁶ .................................................. D01G 15/40
[52] U.S. Cl. ............................. 19/105; 19/145.5; 19/300
[58] Field of Search .................................. 19/105, 145.5, 19/145.7, 296, 300

[56] References Cited

U.S. PATENT DOCUMENTS

| | | | |
|---|---|---|---|
| 4,133,455 | 1/1979 | Moser | 19/105 |
| 4,574,433 | 3/1986 | Brunnschweiler | 19/105 |
| 4,709,451 | 12/1987 | Leifeld | 19/105 |
| 4,812,993 | 3/1989 | Konig et al. | 19/105 |

FOREIGN PATENT DOCUMENTS

| | | | |
|---|---|---|---|
| 0122717 | 10/1984 | European Pat. Off. | 23/6 |
| 7506987 | 10/1975 | France | 23/6 |
| 3619248 | 12/1987 | Germany | 23/4 |
| 3913733 | 3/1990 | Germany | 23/4 |
| 4153328 | 5/1992 | Japan | 23/6 |

*Primary Examiner*—C. D. Crowder
*Assistant Examiner*—Larry D. Worrell, Jr.
*Attorney, Agent, or Firm*—Christie, Parker & Hale, LLP

[57] ABSTRACT

A fiber metering device adapted for feeding fiber to a fiber utilizing assembly. The device comprises a first fiber feeding unit and a spaced apart second fiber feeding unit. The fiber feeding units are spaced apart so that the second unit is downstream with respect to the first unit. The feeding units are independently driven at relatively variable fiber feeding speeds. Each feeding unit includes a weight transducer means sensitive to the weight of fiber being fed by that unit. The speed of each feeding unit is controlled in accordance with the weight of fiber sensed by its associated transducer means.

22 Claims, 2 Drawing Sheets

FIBRE METERING ARRANGEMENT

BACKGROUND OF THE INVENTION

This invention relates to a fiber metering arrangement, for feeding fibre to a fiber utilizing arrangement such for example as a carding machine preparing a card web such as might be utilized, perhaps after cross-folding, in a non-woven fabric producing operation such as a stitch bonding operation.

It is a problem to supply the carding machine with fiber at a constant rate. Irregular fiber supply results in an uneven web which is manifest as density variation in a non-woven fabric produced from it.

The carding machine feeding arrangement withdraws fiber from a static supply such as a hopper in which a "head" of fiber is maintained within height limits by a controlled bale opening arrangement. A roller or lattice, which may be spiked, picks fiber from the bottom of the "head" in the hopper. Since the "head" is variable at least to some extent and since the fibre density in the hopper is not homogeneous, the roller or lattice will pick up fiber at a variable rate and unless countermeasures are taken this variable rate will be reflected in variations at the carding machine input.

Various measures have been proposed to deal with this problem involving weighbelts and weighplates over which the fiber passes en route to the carding machine and which control the speeds of rollers which take fibers from the weighbelt or plate so that if the weight is low the take off roller speed is increased and vice versa in an effort to level out the rate of feed to the card.

These measures do not, however, solve the problem inasmuch as card web still exhibits unevenness attributable to fiber input rate variation, and it is still difficult precisely to control web weight to a desired degree of accuracy.

The present invention provides improved fiber metering arrangements that address these problems.

SUMMARY OF THE INVENTION

The invention comprises a fiber metering arrangement adapted for feeding fiber to a fiber utilizing arrangement comprising at least first and second fiber feeding units spaced apart in the direction of fiber feeding so that the second is downstream with respect to the first and independently driven at relatively variable fiber feeding speeds each having weight transducer means sensitive to the weight of fiber being fed by that unit and the speed of each unit being controlled in accordance with the weight of fiber sensed by its associated transducer means.

The speed of the first unit may be controlled also in accordance with the weight of fiber sensed by the transducer means of the second unit.

The speed of the second unit may be controlled also in accordance with the speed and the weight of fiber sensed by the transducer means of the first unit.

The first and second units may be components of a series of such units. Adjacent units of the series may be interrelated as first and second such units.

The first feeding unit may comprise rollers both ahead of (in the direction of feeding) and following the second feeding unit.

The first feeding unit may comprise two rollers ahead of and at least one roller following the second feeding unit which may itself comprise two rollers.

The arrangement may be adapted to withdraw fiber from a static supply, i.e. the roller or lattice aforementioned that withdraws fiber from the static supply may be a part of the arrangement and within the control philosophy.

Each unit may comprise a driven roller (or rollers).

The unit speeds and weight transducer outputs may be inputs to a neural network adapted or trained to control the unit speeds to give a constant fiber feed rate to the fiber utilizing arrangement.

In another aspect, the invention comprises a fiber metering arrangement adapted for feeding a fiber fleece to a fiber utilizing arrangement comprising a fiber fleece feeding unit having first weight transducer means sensitive to the weight of fiber being fed by that unit and being driven at a variable speed dependent on the weight of fleece sensed by said first transducer means with a fine delay equivalent to the time taken for the fleece to pass from the said unit to an input to the fiber utilising arrangement to ensure a controlled rate of fiber utilization.

The said first weight transducer means may be sensitive to the weight of a small lengthwise extent of fleece.

The arrangement may have additional fiber fleece feed means having associated weight transducer means. Said additional feed means may feed and said associated weight transducer means may be sensitive to the weight of a longer lengthwise extent of fleece than said first weight transducer means.

Said associated weight transducer means may be sensitive to the weight of a lengthwise extent of fleece including the weight to which said first weight transducer means are sensitive.

Said associated weight transducer means may effect control on the rate at which the input to the fiber utilizing means inputs fleece to the said fiber utilizing means.

Said associated weight transducer means may effect control on the rate at which fleece is taken from a source of fiber to be fed to the fiber utilizing means.

Said source of fiber may comprise a hopper. The arrangement may be adapted to control the rate of supply of fiber to the hopper to tend to maintain a constant head or level of fiber in the hopper.

The invention in another aspect comprises a fiber metering arrangement adapted for feeding fiber to a fiber utilizing arrangement comprising a hopper into which fiber is fed at the top and transfer means transferring fiber from below the level of fiber in the hopper to the fiber utilizing arrangement and control means controlling the rate at which fiber is fed into the hopper to maintain the head or level of fiber substantially constant above the level at which the transfer means takes fiber from the hopper.

BRIEF DESCRIPTION OF DRAWINGS

Embodiments of fiber metering arrangements according to the invention will now be described with reference to the accompanying drawings, in which.

DETAILED DESCRIPTION OF THE PREFERRED EMBODIMENTS

Figure 1:
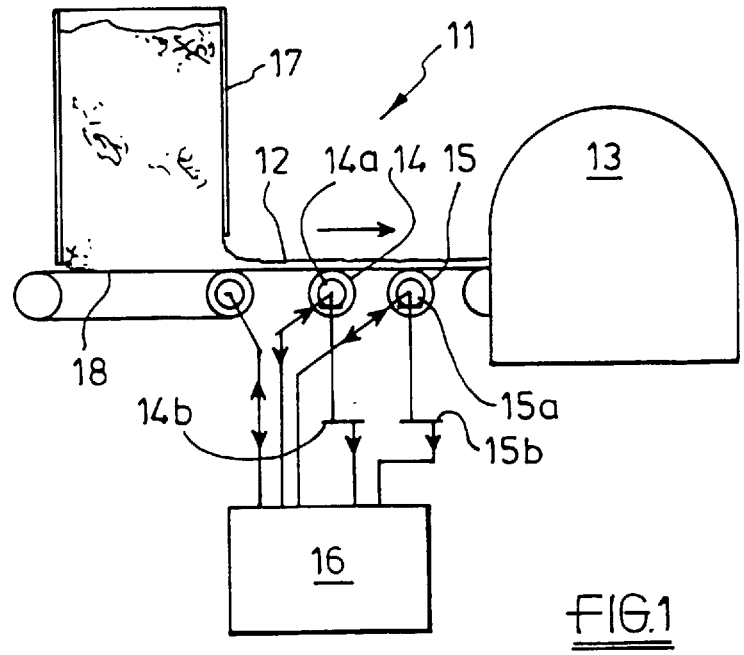
FIG. 1 is a diagrammatic illustration of a two-unit arrangement.
Figure 2:
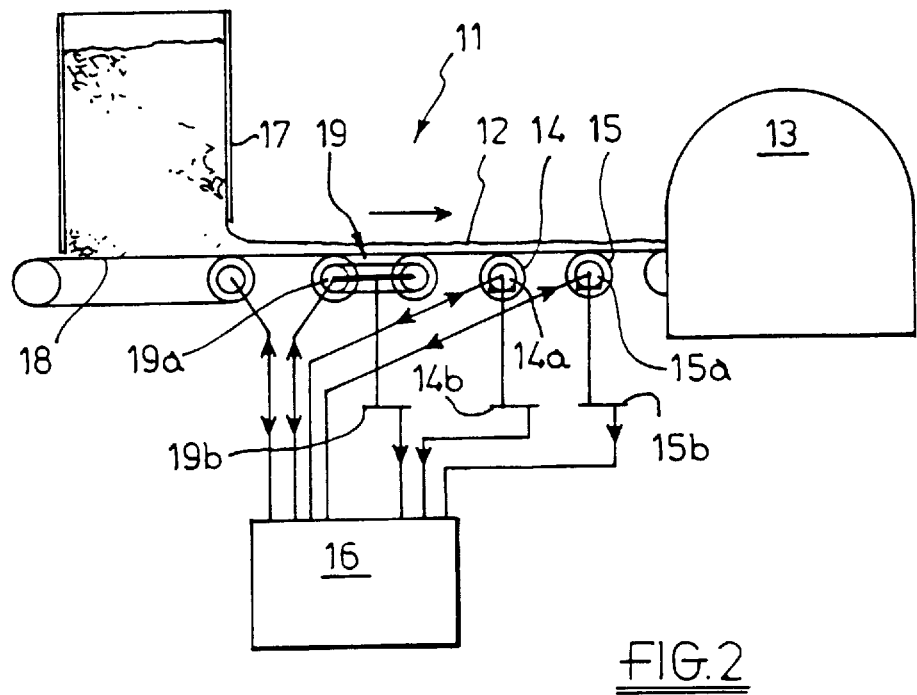
FIG. 2 is a diagrammatic arrangement of a three-unit, four rollers arrangement.

FIGS. 1 and 2 of the drawings illustrate fiber metering arrangements 11 adapted for feeding fiber 12 to a fiber utilizing arrangement—in each case a carding machine 13 producing a card web for utilization in non-woven fabric manufacture or for the production of spun yarn.

The fiber metering arrangements comprise at least first and second fiber feeding units 14,15 spaced apart in the direction of fiber feeding—indicated by the arrow so that the second unit 15 is downstream of the first unit 14. The units 14,15 are independently driven at relatively variable fiber feeding speeds by having electric motors 14a,15a for example stepper motors which can be speed controlled by controlling the rate of supply of energising pulses.

Each unit 14,15 has weight transducer means 14b,15b sensitive to the weight of fiber being fed by that unit. The entire roller and motor assembly can be supported for example on load cells, or perhaps just the roller may be supported on load cells, the motor being separately mounted and connected to drive the roller through a flexible coupling or otherwise so that the connection of the roller to the motor does not substantially affect the weighing.

The speed of each unit 14,15 is controlled by a controller 16 in accordance with the weight of fiber sensed by its associated transducer means.

If, for example, the downstream, second roller 15 has a reduced fiber loading, as sensed by the transducer 15b, it can be arranged to increase in speed so as to increase the linear rate of supply of fiber to the carding machine 13 to compensate and maintain a constant mass of fiber per unit time.

The increase in speed of downstream roller 15 will take fiber faster from roller 14 which in turn will experience a reduction in the weight of fiber being fed by it and speed up in response so as to maintain the fiber mass flow rate to roller 15.

This will compensate for variations in the supply of fiber to the rollers 14,15 which variations are occasioned by the non-homogeneous nature of the fiber mass removed from a hopper 17 by a spiked lattice 18 (or equivalent means such as a spiked roller). The hopper is fed with fiber freshly pulled from opened bales by a conventional spiked lattice arrangement controlled in accordance with the weight of fiber in the hopper 17 or the height the fiber reaches in the hopper 17 as may be sensed by a photoelectric arrangement.

More sophisticated control techniques can be used. Thus the speed of the first, upstream unit 14 can also be controlled in accordance with the weight of fiber sensed by the transducer 15b of the second, downstream unit 15. The second unit 15 sensing it is light of fiber calls on the first unit 14 to feed faster. Of course, since the first unit 14 is also reacting to the fiber weight sensed by its own transducer 14b, should that transducer 14b register an increased weight, the unit will tend to slow down, and the result will be a balance between the demand signal from unit 15 and the supply signal from transducer 14b.

The speed of the second, downstream unit 15 may also be controlled in accordance with the speed and the weight of fiber sensed by the transducer 14b. Thus if unit 14 was oversupplying fiber to unit 15, unit 15 could be retarded to anticipate the oversupply.

FIG. 1 illustrates an arrangement in which units 14 and 15 are fed directly from the lattice 12 and the speed of the lattice is controlled by the controller 16. This speed can also be controlled in accordance with the speeds and fiber weights on one or other or both of the units 14,15.

FIG. 2 illustrates an arrangement in which a coupled roller pair 19 having a single drive motor 19a and a single weighing transducer 19b is interposed between the lattice 12 and the first unit 14 and this may be regarded as another element of the metering arrangement functioning in the same way as units 14 and 15, so that units 19 and 14 may equally well be regarded as first and second units for purposes of the above description.

The control philosophy can be implemented in the microprocessor or computer in the controller 16. If the speed of each roller is controlled solely by the weight of fiber on it, it will be necessary to predetermine the nominal fiber weight on the roller to yield a given card web weight at the nominal feed speed and to assign a value to a constant interconnecting a decrease in weight an increase in speed, and to do that for each of the units.

With more sophisticated control philosophies, constants will have to be assigned to the relationships between speed increase or decrease of one unit and weight decrease or increase of another unit.

This process might be handled, instead, however, by a neural network in the controller 16 which could learn or be taught the constants as weightings for hidden units interconnecting input and output units so as to achieve the desired result of a constant rate of supply of fiber to the carding machine.

The use of a series of feed units can in this way even out irregularities in weight/unit length of fiber fleece taken from the static supply in the hopper 17, the more units employed, the better the smoothing effect. If the lattice is also controlled, the feed rate can be precisely controlled as well.

Figure 3:
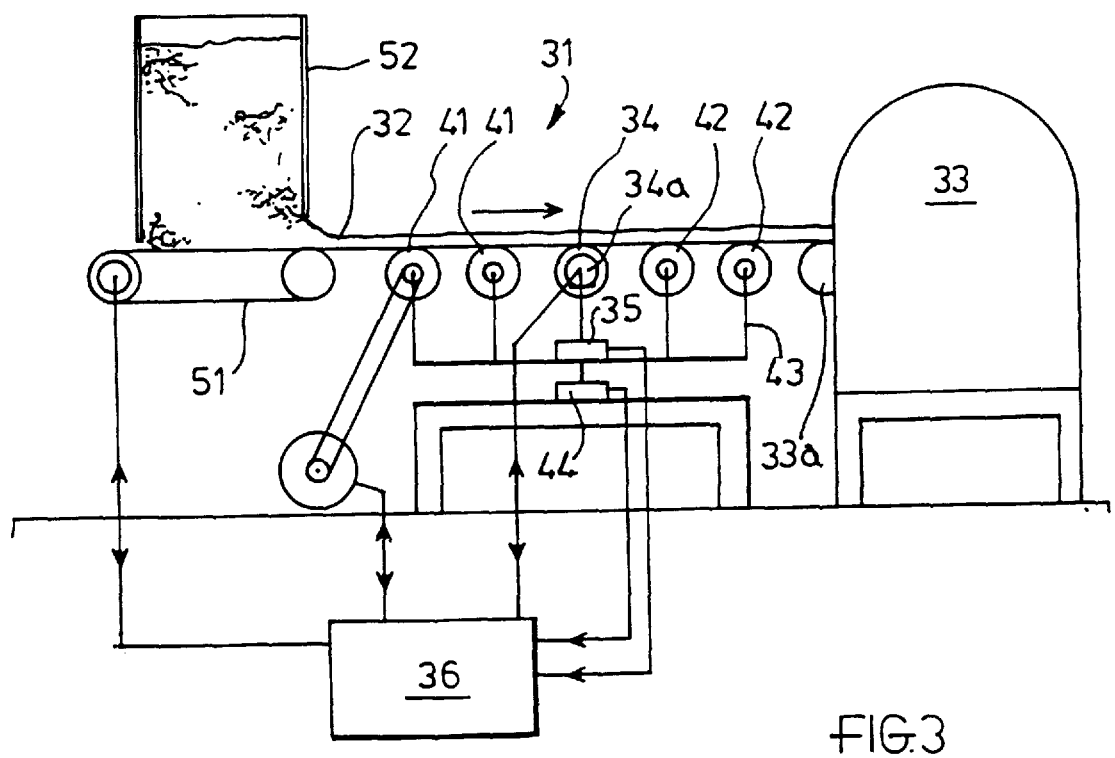
FIG. 3 is a diagrammatic illustration of another arrangement.

FIG. 3 of the drawings illustrates a fiber metering arrangement 31 adapted for feeding a fiber fleece 32 to a fiber utilizing arrangement 33 comprising a fiber fleece feeding unit 34 having first weight transducer means 35 sensitive to the weight of fiber fed by the unit 34. The unit 34, as before, comprises a roller.

Rollers, it should be remarked, are, perhaps surprisingly, particularly well suited as fiber, or fiber fleece, feeding units. They have inertial advantages over belts being more responsive to control. As elements of fiber weighing arrangements they have the advantage over belts that they are lighter in, as it were, "tare" weight, and, over weighplates, they exercise a feeding function that plates cannot.

The roller 34 is driven, as before, by its own electric motor 34a at a variable speed dependent on the weight of fleece 32 sensed by the transducer means 35. The weight signal from the transducer means 35 is input to a control arrangement 36 to that end. However, the response of the motor 34a to a change-in-weight signal is delayed by the time taken for the fleece 32 to pass from the roller 34 to the input to the fiber utilizing arrangement 33. The input to the fiber utilizing arrangement is shown as a licker-in roll 33a. Such control ensures a controlled rate of fiber utilisation.

The transducer means 35 coupled to the rollers 34 are sensitive to the weight of a small lengthwise (i.e. in the direction of fleece travel) extent of fleece 32, namely that between adjacent rollers 41,42. The control is therefore (as before) particularly sensitive to short term variations in fleece density.

The arrangement has additional fiber fleece feed means namely rollers 41,42 or rather, as shown, groups of rollers 41,42. The rollers 41,42 are mounted on a support 43 which has associated weight transducer means 44.

The additional feed means 41,42 feed and their associated weight transducer means 44 are sensitive to the weight of a longer lengthwise extent of fleece than said first weight transducer means 35; in fact, the roller 34 and transducer 35 are themselves mounted on the support 43 so that the transducer means 44 are sensitive to the weight of a lengthwise extent of fleece 32—namely that between lattice 51 and the licker-in 33a—which includes the weight to which the roller 31 is subject and to which its transducer means 35 are sensitive.

Thus the system 31 is sensitive to the weight on all five rollers 41,42,35, and this sensed weight is used to control the overall rate of feed, while the roller 35 is sensitive to short-term variations and controlled so as to smooth those out within the overall feeding rate speed control.

Situating the independently driven roller 34 in between the rollers 41,42, which are driven together, is particularly advantageous in the detection of short-term variations in linear weight of fleece as overfeeding the fleece 32 to the roller 34, or overfeeding the fleece 32 past the roller 34 to the roller 42 could tend to arch the fleece over the roller 34 leading to a reduced weight indication. This can be avoided by suitable control measures in the arrangement illustrated.

The associated weight transducer means 44 taken together with knowledge of the surface speed of the rollers 41,42 gives an indication of the rate of mass transfer to the licker-in 33a and this can be used to effect control of the rate at which the input to the fiber utilizing means—namely the licker-in 33a—inputs fleece to the utilizing means 33—in other words, effect control over the speed of the licker-in 33a.

At the same time, control can be effected over the rate at which fleece 32 is taken from a source of fiber 52 to be fed to the fiber utilizing assembly 33, namely over the speed of the lattice 51 which takes fiber from the bottom of a hopper 52.

The fiber metering device 31 may also be used to control the rate of supply of fiber to the hopper 52 to tend to maintain a constant head or level of fiber in the hopper 52—this can be instead of or ancillary to a level control as described with reference to FIGS. 1 and 2.

The fiber metering device 31 effectively combines the advantages of a long fiber weighing zone for the control of the average rate of feed and of a short weighing zone for smoothing out short term variations in the overall rate.

Over a wide system, the units can be split transversely into two or more independent units so as to control variations across the width of the card web.

As illustrated the units comprise simple conveyor rollers operative to move the fiber by friction due to its weight. However any one or more of the units could include a nip roller arrangement for more positive control.

What is claimed is:

1. A fiber metering device for feeding fiber to a fiber utilizing assembly, the fiber metering device comprising:

a first fiber feeding unit for feeding fiber along a feeding direction;

a second fiber feeding unit spaced apart from said first fiber feeding unit, said second fiber feeding unit being downstream from the first feeding unit in the feeding direction;

a first drive means for driving the first feeding unit;

a second drive means for driving the second feeding unit, the first drive means operable independently of the second drive means for operating the first and second feeding units at different fiber feeding speeds;

a first weight transducer means for sensing the weight of fiber being fed by the first fiber feeding unit;

a second weight transducer means for sensing the weight of fiber being fed by the second fiber feeding unit; and control means connected to the first and second transducer means for controlling the fiber feeding speed of the first fiber feeding unit in accordance with the weight of fiber sensed by the first weight transducer means and controlling the fiber feeding speed of the second fiber feeding unit in accordance with the weight of fiber sensed by the second weight transducer means.

2. A fiber metering device as recited in claim 1 wherein the control means utilizes both the first and second transducer means to control the speed of the first fiber feeding unit.

3. A fiber metering device as recited in claim 1 wherein the control means utilizes both the first and second transducer means to control the speed of the second fiber feeding unit.

4. A fiber metering device as recited in claim 1 wherein the control means utilizes both the first and second transducer means to control the speeds of the first and second fiber feeding units.

5. A fiber metering device as recited in claim 1, and further comprising a third fiber feeding unit coupled with a third driving means for driving the third feeding unit and wherein the first, second and third fiber feeding units form a series of fiber feeding units.

6. A fiber metering device as recited in claim 5 wherein adjacent fiber feeding units are interrelated as first and second fiber feeding units.

7. A fiber metering device as recited in claim 1 wherein the first fiber feeding unit comprises at least one roller before and at least one roller following the second fiber feeding unit along the feeding direction.

8. A fiber metering device as recited in claim 4 wherein the first fiber feeding unit comprises at least one roller before and at least one roller following the second fiber feeding unit along the feeding direction.

9. A fiber metering device as recited in claim 1 wherein the first fiber feeding unit comprises a plurality of rollers before and at least one roller following the second fiber feeding unit along the feeding direction.

10. A fiber metering device as recited in claim 7 wherein the second fiber feeding unit comprises a plurality of rollers.

11. A fiber metering device as recited in claim 1 and further comprising a device for removing fiber from a static supply.

12. A fiber metering device as recited in claim 1 wherein each of the first and second weight transducers have outputs which are input to a neural network which controls the speed of each of the first and second fiber feeding units to yield a constant feed rate to the fiber utilizing assembly.

13. A fiber metering device for feeding a fleece fiber from a supply of fleece fiber to a fiber utilizing assembly, the fiber metering device comprising:

a first fiber feeding unit for feeding the fleece fiber in a feeding direction, the fiber feeding unit capable of feeding the fiber at a variable rate along the feeding direction;

a first weight transducer means for sensing the weight of fiber being fed by the first fiber feeding unit;

a controller coupled to the first weight transducer means and the feeding unit for controlling the fiber feeding speed of the first fiber feeding unit in accordance with the weight of fiber sensed by the first weight transducer means, the controller incorporating a time delay equivalent to the time required for the fleece fiber to pass from the feeding unit to an input on the fiber feeding assembly for providing a controlled rate of fiber feeding.

14. A fiber metering assembly as recited in claim 13 wherein the first weight transducer means is sensitive to the weight of a first lengthwise extent of fleece.

15. A fiber metering assembly as recited in claim 13, and further comprising a second fiber feeding unit having an associated second weight transducer means for sensing the weight of the fleece fiber being fed by the second feeding unit.

16. A fiber metering assembly for feeding a fleece fiber from a supply of fleece fiber to a fiber utilizing assembly, the fiber metering device comprising:

a first fiber feeding unit for feeding the fleece fiber in a feeding direction, the first fiber feeding unit capable of feeding the fiber at a first variable rate along the feeding direction;

a first weight transducer means for sensing the weight of fiber being fed by the first fiber feeding unit and being sensitive to the weight of a first lengthwise extent of fleece;

a second fiber feeding unit for feeding the fleece fiber, the second fiber feeding unit capable of feeding the fiber at a second variable rate along the feeding direction;

a second weight transducer means for sensing the weight of fiber being fed by the second fiber feeding unit, the second weight transducer means being sensitive to a second lengthwise extent of fleece, said second lengthwise extend of fleece being longer than said first lengthwise extend of fleece;

a controller coupled to the first and second weight transducer means and to the first and second fiber feeding units for controlling the fiber feeding speed of the first fiber feeding unit in accordance with the weight of fiber sensed by the first weight transducer means and the fiber feeding speed of the second feeding unit in accordance with the weight of fiber sensed by the second weight transducer means, the controller incorporating a time delay equivalent to the time required for the fleece fiber to pass from the first feeding unit to an input on the fiber feeding assembly for providing a controlled rate of fiber feeding.

17. A fiber metering assembly as recited in claim 16 wherein the second weight transducer means is sensitive to a lengthwise extent of fleece including sensitivity to the weight to which the first transducer means is sensitive.

18. A fiber metering assembly as recited in claim 16, wherein the control means utilizes an output from each of the first and second weight transducer means to control the rate at which fleece is fed to the input of the fiber utilizing assembly.

19. A fiber metering assembly as recited in claim 17 wherein the control means utilizes an output from each of the first and second weight transducer means to control the rate at which fleece is taken from the source of fleece fiber.

20. A fiber metering assembly as recited in claim 19 wherein the source of fiber comprises a hopper.

21. A fiber metering assembly as recited in claim 20 wherein the control means utilizes an output from each of the first and second weight transducer means to control the rate at which fleece fiber is supplied to the hopper for maintaining a constant level of fiber in the hopper.

22. A fiber metering assembly for feeding fiber from a supply of fiber to a fiber utilizing arrangement, the fiber metering assembly comprising:

a hopper having a top into which the supply of fiber is fed;

transfer means for transferring the fiber from the hopper to the fiber utilizing arrangement, the transfer means including at least two spaced apart fiber feeding units, each feeding unit being connected to an associated weight transducer for sensing the weight of fiber being fed by the respective feeding unit; and control means connected to each of the feeding units and the associated weight transducers for controlling the supply of fiber to the fiber utilizing arrangement;

wherein the control means further controls the rate at which the fiber is fed into the hopper such that the level of fiber in the hopper is substantially maintained above the level at which the transfer means removes fiber from the hopper.

* * * * *